Feb. 20, 1951 S. W. G. BEARD 2,542,463
CYLINDER-PISTON MOTOR WITH MEANS FOR STOPPING
RELATIVE MOVEMENT OF THE MOTOR PARTS
Filed Feb. 13, 1947 2 Sheets-Sheet 2
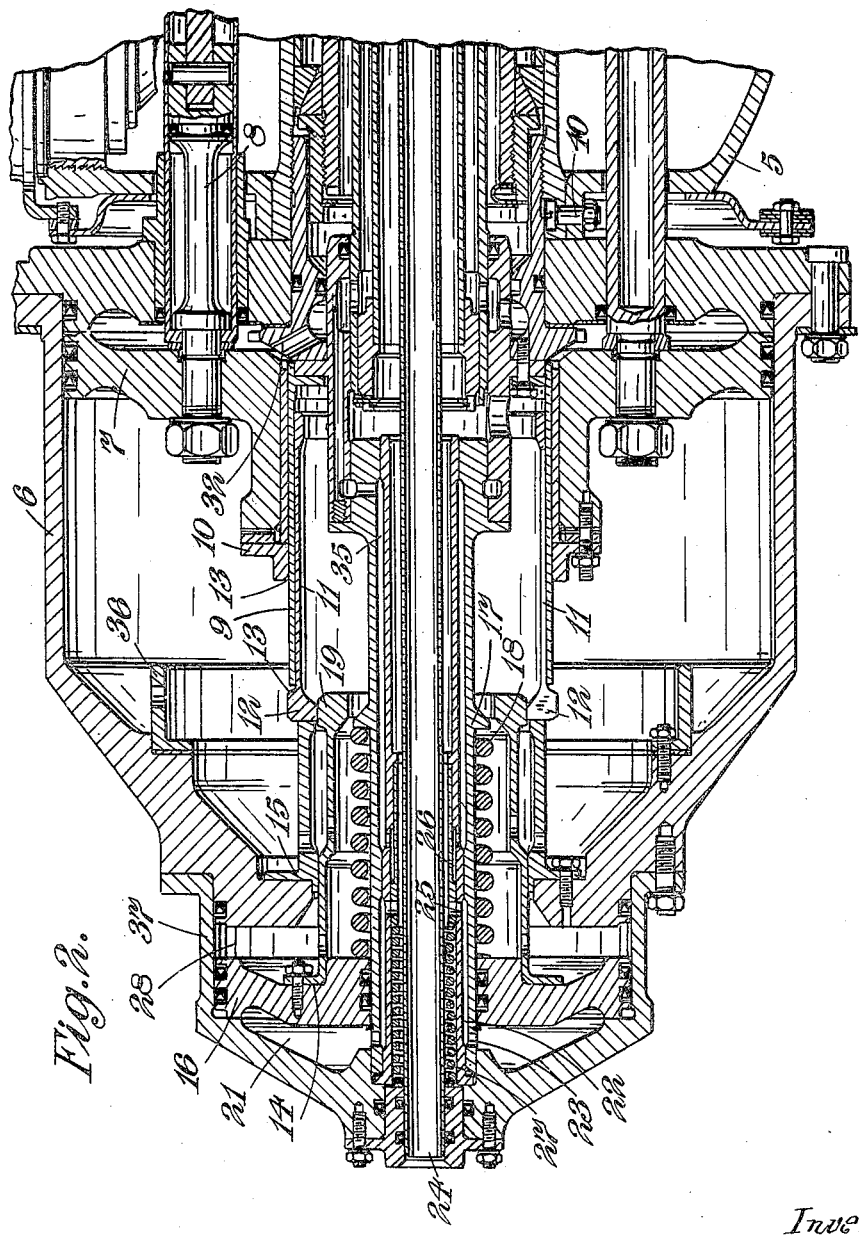
Inventor
Samuel W. G. Beard
by Wilkinson & Mawhinney
Attorneys Patented Feb. 20, 1951

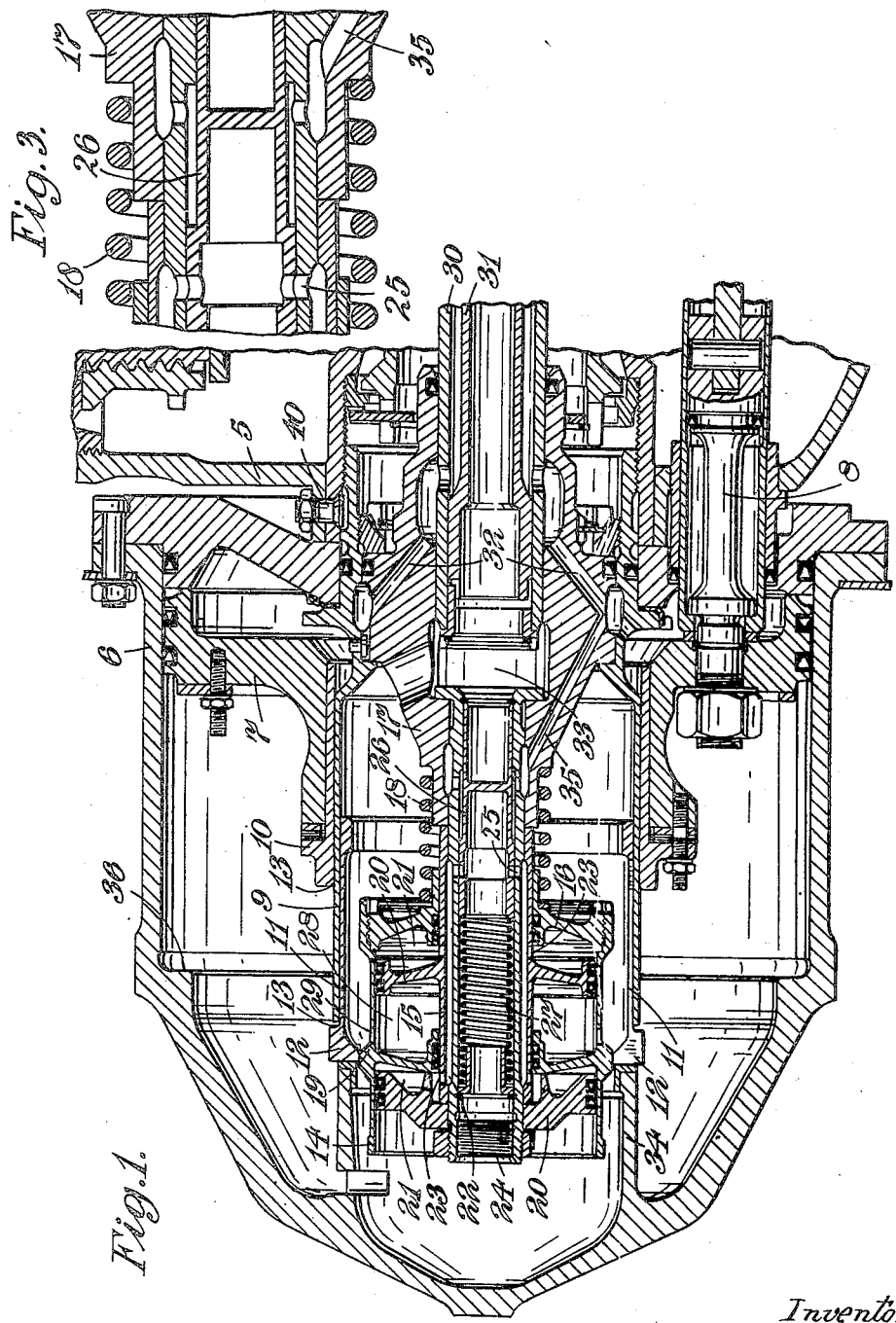

2,542,463

UNITED STATES PATENT OFFICE 2,542,463

CYLINDER-PISTON MOTOR WITH MEANS FOR STOPPING RELATIVE MOVEMENTS OF THE MOTOR PARTS

Samuel William George Beard, Gloucester, England, assignor to Rotol Limited, Gloucester, England, a British company Application February 13, 1947, Serial No. 728,340 In Great Britain January 11, 1946

Section 1, Public Law 690, August 8, 1946 Patent expires January 11, 1966

4 Claims. (Cl. 121—38)

This invention relates to cylinder-piston motors and more particularly to a mechanical device for stopping the relatively movable parts of the motor in a predetermined intermediate position. The invention is also applicable to the motors incorporated in hydraulically operated variable pitch propellers.

It is often desirable in hydraulic cylinder-piston motors to provide an intermediate stop position within the range of movement of the piston and to permit movement of the piston beyond this position only under predetermined circumstances. For example, in hydraulically operated variable pitch propellers wherein the pitch range of the blade is sufficient to permit operation under reverse thrust conditions, it is not only desirable but essential under normal conditions that blades shall only change pitch between a normally fine setting and a coarser setting, the blades only being permitted to move below the fine pitch setting to reverse thrust when a deliberate action is made.

The main object of the present invention is to provide simple and efficient means for ensuring such intermediate action in a cylinder-piston motor.

In order that the invention may be clearly understood a practical embodiment will now be described, by way of example, with reference to the accompanying drawings whereof, Figure 1 is a sectional elevation of a hydraulic jack of a variable pitch propeller in accordance with the present invention, Figure 2 is a similar view to Figure 1 and showing a modified construction, and Figure 3 is a sectional elevation of a part of the mechanism of Figure 1 and to an enlarged scale to show certain details of construction.

Referring to Figure 1: the hub of the propeller is indicated at 5 and this has secured to it a cylinder 6 within which slides a piston 7 coupled to the blades of the propeller through links 8 in known manner. The cylinder and piston assembly form a hydraulic motor for altering the pitch of the blades, and the travel of the piston 7 is of such an extent that the blades can be turned from the feathered to a reversed pitch position. In the arrangement shown the piston 7 travels to the left to turn the blades towards reverse pitch and to the right to turn the blades to the coarse pitch or feathered position.

The piston 7 is an annular piston and slides on an annular guide 9 which is attached to the hub 5 of the propeller, as at 40. The piston 7 has an annular extension 10 which will be hereinafter termed the "buffer-sleeve."

To the interior of the free end of the annular guide 9 there is secured an annular sleeve-like member 11 which is slotted axially (see the lower half of the drawing) to provide a plurality of resilient tongues or struts, this slotted sleeve constituting what will hereinafter be termed a "radially resilient abutment." The free ends of the tongues are thickened to form abutment shoulders 12 and their external diameter is chosen so that in the normal position of the abutments the buffer-sleeve 10 will engage therewith. The adjacent faces of the abutment shoulders 12 and the buffer sleeve 10 are chamfered as shown at 13.

Within the resilient abutment 11 there is arranged a movable cylindrical member 14 which is guided on an annular guide 15. Between the rear wall 16 of this plug and a fixed member 17 disposed centrally within the cylinder 6 there is arranged a spring 18. The latter tends to push the cylindrical member 14 towards the left in Figure 1. The cylindrical member 14 is formed with an external ring 19 whose diameter is chosen so that it is a sliding fit within the abutment shoulders 12, and in the position of the plug shown in Figure 1, the tongues of the resilient abutment are prevented from collapsing radially inwards by the ring 19.

The annular guide 15 is associated with piston members 20 between which and correspondingly formed members on the cylindrical member 14 there is defined the spaces 21. The latter are in communication with a duct 22 through holes 23 in the guide 15. The guide 15 is supported upon a central tube 24 having a radial hole 25 which places the duct 22 in communication with the interior of a piston valve 26 mounted therein. The latter is urged by a spring 27 towards the right so that the hole 25 is open to the interior of the valve.

The central space 28 within the cylindrical member 14 communicates with the left hand side of the cylinder 6 by means of a hole 29 in the annular wall of the cylindrical member.

The main operating pressure-fluid for the pitch-adjusting jack is conveyed thereto by a nested pair of tubes 30, 31, the space between the tubes communicating by a duct 32 with the right hand end of the cylinder 6. Thus, when pressure-fluid passes into the space between the tubes 30, 31 along duct 32 and to the right hand end of the cylinder 6, the piston 7 is moved towards the left to turn the blades towards reverse pitch. The interior of tube 31 communicates with a space 33 which is itself in communication with the left hand end of the cylinder 6. Thus, when pressure-fluid is directed along tube 31 it enters space 33 and the left hand end of the cylinder so that the piston 7 is moved to the right to turn the blades of the propeller to the coarse pitch or feathered position. As stated above this pressure-fluid will also be in communication with the space 28 through the hole 29.

By arranging pressure-fluid to be delivered to one side of the piston 7 whilst fluid from the other side is open to exhaust the piston can be caused to move axially and thereby vary the pitch of the blades as indicated.

The axial position of the resilient abutment 11 is determined by the flange 34 which is integrally formed with the cylinder 6. The length of flange 34 is so chosen that when the buffer-sleeve 10 engages the abutment shoulders 12 the blades of the propeller are in a predetermined position, namely, the fine pitch position. With the normal working pressure of the hydraulic fluid supplied to the piston 7 to effect such engagement of the buffer sleeve and abutment shoulders, the valve 26 will be held in its extreme right hand position by spring 27. When the blades reach their fine pitch position further movement is prevented by the engagement of the buffer sleeve with the abutment shoulders 12, the tongues being prevented from inward radial collapse by the ring 19 of member 14. The piston 7 may therefore not move further to the left and the propeller blades are held in the fine pitch position.

When it is desired that the piston 7 move further to the left to turn the blades to a reverse pitch position, fluid at a pressure higher-than-normal is supplied to the right hand end of the cylinder 6 by way of duct 32 as described above. It will be observed that the duct 32 also communicates with the valve 26 by way of channel 35 and that the pressure of the fluid passing to the right hand end of the cylinder 6 is applied to the valve 26 to urge it towards the left i. e. against spring 27. Accordingly when the higher-than-normal pressure acts on the piston 7 its application to valve 26 moves the latter towards the left, spring 27 being designed to allow this. The valve will therefore be opened and permit the application of this pressure to the spaces 21, the fluid passing thereto by hole 25, duct 22 and holes 23. The member 14 is thereby moved against the effort of its spring 18 to withdraw ring 19 from under the abutment shoulders 12. As a consequence the tongues of the resilient abutment 11 are free to move radially inwards. The higher-than-normal pressure is also acting on the piston 7 and causing the buffer sleeve 10 to press against the abutment shoulders 12, the point of engagement being the chamfered edges 13. When the member 14 is removed as described the engagement of these chamfered edges with the pressure behind the piston 7 will cause the tongues of the resilient abutment to collapse radially inwards, thus allowing the sleeve 10 to travel over the abutment shoulders 12 and the piston 7 to move further to the left in Figure 1. In this way the blades are rotated to a reverse pitch position. This movement is terminated by the engagement of the piston 7 with a stop 36 formed on the wall of cylinder 6.

Upon reversal of the pressure fluid supplied to the hydraulic motor (which may be still at higher-than-normal pressure) so as to cause piston 7 to move to the right, this fluid is no longer applied to the valve 26 and it is therefore returned by spring 27 to the position shown. Consequently the spaces 21 are placed in communication by holes 23, duct 22 and hole 25 with the left hand end of the cylinder 6. As has been stated above space 28 is permanently in communication with the left hand end so that the hydraulic pressures on each side of the member 14 are equal and the spring 18 is thereby enabled to return the member 14 to its initial position where the ring 19 lies under the abutment shoulders 12. This will occur consequent upon the piston 7 being moved towards the right so that the buffer sleeve 10 is clear of the abutment shoulders. The ring 19 has sloping sides so as radially to push the tongues of the resilient abutment 11 outwardly when the member 14 is being returned to its normal position.

In the modification shown in Figure 2 like parts to Figure 1 are indicated by like numerals. It will be observed that the construction of Figure 2 is generally the same as Figure 1, but in this case the member 14 has a piston member 16 which is slidable within a cylindrical wall 37 which is attached to the cylinder 6 of the hydraulic jack at the front end thereof. The member 14 is guided by annular guide 15. The passage of higher-than-normal pressure fluid to the space 21 is regulated by the valve 26 in the same way as described above. When this pressure is applied to the hydraulic jack it acts upon the valve to open it and as a result the pressure fluid is admitted to the space 21 to move the member 14 towards the right. The ring 19, is therefore, moved towards the right to disengage the abutment shoulders 12 for the purpose indicated: the propeller blades will then be moved to the reverse pitch position. When it is desired to un-reverse the propeller blades pressure fluid is admitted to the left hand end of the cylinder 6 to move the piston 7 to the right and at the same time the higher-than-normal pressure will be disconnected from the valve 26. The latter will be returned by its spring 27 so as to place the space 21 in communication with the left hand end of the cylinder 6. The pressure on each side of the piston member of member 14 will therefore be balanced and it will be moved by its spring 18 to bring the ring 19 under the abutment shoulders 12.

I claim:

1. A cylinder-piston motor comprising a stop to prevent relative movement between the piston and the cylinder intermediate the limits of stroke of the motor, resilient means urging the stop in a transverse direction out of the path of the movable part of the motor, a second piston means for normally holding the stop in said operative position, spring means to maintain said second piston in its normal holding position and valve means for applying the working pressure of the motor to the second piston to move said second piston to disengage the stop when said pressure becomes higher-than-normal upon engagement of the movable part of the motor with the stop.

2. A cylinder-piston motor comprising a stop to prevent relative movement between the piston and the cylinder intermediate the limits of stroke of the motor, resilient means urging the stop in a transverse direction out of the path of the movable part of the motor, a second piston means for normally holding the stop in said operative position, spring means to maintain said second piston in its normal holding position, a piston valve also subject to the working pressure, and spring means holding the valve shut, the valve being moved to its open position when the working pressure is greater-than-normal whereby said greater pressure is applied to the second piston to move it to disengage the stop.

3. A cylinder-piston motor comprising a stop to prevent relative movement between the piston and the cylinder intermediate the limits of stroke of the motor, resilient means urging the stop in a transverse direction out of the path of the movable part of the motor, a second piston means for normally holding the stop in said operative position, spring means to maintain said second piston in its normal holding position, a two-position valve arranged so that in one position the working fluid is applied to the second piston and in the other position the pressure fluid on the second piston is released, and spring means normally holding the valve in its second position, the valve being moved to its first position when the working pressure is greater-than-normal whereby said greater pressure is applied to the second piston to move it to disengage the stop.

4. A cylinder-piston motor as claimed in claim 3 wherein the stop comprises a set of radially-resilient, circularly disposed abutments against which a buffer sleeve, carried by the movable part of the motor, is adapted to abut.

SAMUEL WILLIAM GEORGE BEARD.

REFERENCES CITED

The following references are of record in the file of this patent:

UNITED STATES PATENTS

| Number | Name | Date |
|---|---|---|
| 1,330,557 | Simmon | Feb. 10, 1920 |
| 2,118,890 | Maes | May 31, 1938 |
| 2,221,979 | Levy | Nov. 19, 1940 |
| 2,314,444 | Crittenden | Mar. 23, 1943 |

FOREIGN PATENTS

| Number | Country | Date |
|---|---|---|
| 493,652 | Great Britain | Oct. 12, 1938 |